United States Patent
Anand et al.

(10) Patent No.: US 11,501,727 B2
(45) Date of Patent: Nov. 15, 2022

(54) CIRCUIT DEVICE, DISPLAY DEVICE, ELECTRONIC APPARATUS, MOBILE BODY, AND CONTROL METHOD

(71) Applicant: Seiko Epson Corporation, Toyko (JP)

(72) Inventors: Kumar anandabairavasamy Anand, Richmond (CA); Hideki Matsuda, Chino (JP); Kwok lap jimmy Lai, Vancouver (CA)

(73) Assignee: SEIKO EPSON CORPORATION

( * ) Notice: Subject to any disclaimer, the term of this patent is extended or adjusted under 35 U.S.C. 154(b) by 0 days.

(21) Appl. No.: 17/131,835

(22) Filed: Dec. 23, 2020

(65) Prior Publication Data

US 2021/0193066 A1   Jun. 24, 2021

(30) Foreign Application Priority Data

Dec. 24, 2019   (JP) .............................. JP2019-232411

(51) Int. Cl.
    *G09G 3/36* (2006.01)
    *G09G 5/10* (2006.01)
    *G02F 1/13357* (2006.01)

(52) U.S. Cl.
    CPC ............. *G09G 3/3648* (2013.01); *G09G 5/10* (2013.01); *G02F 1/133603* (2013.01); *G09G 2320/0646* (2013.01); *G09G 2380/10* (2013.01)

(58) Field of Classification Search
    CPC ................... G09G 3/3648; G09G 5/10; G09G 2320/0646; G09G 2380/10; G09G 2360/16; G09G 3/3426; G09G 3/3611; G09G 3/3406; G09G 3/36; G09G 2320/062; G02F 1/133603; G02F 1/133601
    See application file for complete search history.

(56) References Cited

U.S. PATENT DOCUMENTS

| | | | |
|---|---|---|---|
| 2008/0129677 A1 | 6/2008 | Li et al. | |
| 2009/0115720 A1* | 5/2009 | Inada | G09G 3/3426 345/102 |
| 2009/0295706 A1 | 12/2009 | Feng | |
| 2010/0238201 A1* | 9/2010 | Nonaka | G09G 3/3611 345/102 |
| 2010/0309107 A1 | 12/2010 | Muroi et al. | |

(Continued)

FOREIGN PATENT DOCUMENTS

| | | |
|---|---|---|
| JP | 2008-139871 A | 6/2008 |
| JP | 2009-192963 A | 8/2009 |

(Continued)

*Primary Examiner* — Sahlu Okebato
(74) *Attorney, Agent, or Firm* — Harness, Dickey & Pierce, P.L.C.

(57) ABSTRACT

A circuit device 100 includes a light source driving value output unit 150 and a pixel value output unit 190. The light source driving value output unit 150 obtains a corrected intensity image Lled by correcting an intensity image Lint of an input image RGBin in a target display zone based on the light intensity distribution of a light source corresponding to the target display zone, and obtains a light source driving value Ldrv based on the largest corrected intensity value in the corrected intensity image Lled. The pixel value output unit 190 corrects pixel values of the input image RGBin based on the light source driving value Ldrv, and outputs the corrected pixel values as pixel values of an output image RGBout.

11 Claims, 9 Drawing Sheets

(56) References Cited

U.S. PATENT DOCUMENTS

| | | |
|---|---|---|
| 2010/0321414 A1 | 12/2010 | Muroi et al. |
| 2011/0115827 A1 | 5/2011 | Tanaka |
| 2011/0169873 A1* | 7/2011 | Sano .................... G09G 3/3611 345/102 |
| 2012/0038693 A1* | 2/2012 | Kang ................... H04N 9/3117 353/31 |
| 2012/0139974 A1 | 6/2012 | Sakai et al. |
| 2015/0287368 A1 | 10/2015 | Ninan et al. |
| 2018/0061368 A1* | 3/2018 | Sako ....................... G06T 5/007 |
| 2018/0174532 A1 | 6/2018 | Ninan et al. |

FOREIGN PATENT DOCUMENTS

| | | |
|---|---|---|
| JP | 2011-514978 A | 5/2011 |
| JP | 2016-510909 A | 4/2016 |
| JP | 2019-120774 A | 7/2019 |
| WO | 2009/041574 A1 | 4/2009 |
| WO | 2009/101727 A1 | 8/2009 |
| WO | 2010/024009 A1 | 3/2010 |
| WO | 2011/013404 A1 | 2/2011 |

\* cited by examiner

CIRCUIT DEVICE, DISPLAY DEVICE, ELECTRONIC APPARATUS, MOBILE BODY, AND CONTROL METHOD

The present application is based on, and claims priority from JP Application Serial Number 2019-232411, filed Dec. 24, 2019, the disclosure of which is hereby incorporated by reference herein in its entirety.

BACKGROUND

1. Technical Field

The present disclosure relates to circuit devices, display devices, electronic apparatuses, mobile bodies, control methods, and the like.

2. Related Art

Techniques of local dimming in which a plurality of light sources are arranged as a backlight in a display device, and the luminance of each of the light sources is individually controlled are known. JP-A-2009-192963 and JP-A-2019-120774 disclose techniques for correcting light source luminance in local dimming. Specifically, JP-A-2009-192963 discloses a technique for obtaining a desired brightness in an edge portion of a display panel in which light of a light source is reflected, by suppressing the influence of the reflection. JP-A-2019-120774 discloses a technique for dividing a display area of a liquid crystal panel into a plurality of blocks for which respective LEDs are arranged in one-to-one correspondence, and correcting the LED luminance of each of the blocks surrounding a block of interest using approximate luminance.

JP-A-2009-192963 and JP-A-2019-120774 are examples of the related art.

The luminance of a pixel in a display image depends on the transmissivity of the pixel and the luminance of a light source that illuminates the pixel. In local dimming, the contrast of a display image is improved by controlling the transmissivity of each pixel and the luminance of a light source so as to decrease the luminance of the light source as much as possible within a range in which desired luminance of the pixel is obtained. In such local dimming, a phenomenon of the luminance of a high luminance portion of a display image being insufficient as a result of the light intensity of illumination light being insufficient is called clipping.

Assume that the display area of a display panel is divided into a plurality of display zones for which respective light sources are arranged in one-to-one correspondence. At this time, a light source that illuminates the display panel exhibits light intensity distribution in which the farther the display panel is separated from the light source, the smaller the light intensity becomes. Therefore, the light intensity is smaller in a peripheral portion of a display zone than at the center of the display zone. This light intensity distribution of the light source is called a "PSF". There is the issue that the light intensity of illumination light becomes insufficient in the peripheral portion of each display zone due to this PSF, and clipping occurs. When clipping occurs, proper luminance is not obtained in a high luminance portion, and thus the contrast degrades. The above-described known techniques do not disclose any technique for correcting clipping that occurs due to such a PSF. Note that PSF is an abbreviation for Point Spread Function.

SUMMARY

One aspect of the present disclosure relates to a circuit device that is used for a display device that includes a display panel and a backlight provided with a plurality of light sources, and the circuit device includes: a light source driving value output unit that outputs light source driving values of the plurality of light sources, and a pixel value output unit that corrects pixel values of an input image based on the light source driving values, and outputs the corrected pixel values, the plurality of light sources are provided in correspondence with a plurality of display zones obtained as a result of dividing a display area of the display panel, and the light source driving value output unit obtains a corrected intensity image by correcting an intensity image of the input image in a target display zone out of the plurality of display zones based on a light intensity distribution of a light source corresponding to the target display zone, and obtains a light source driving value based on the largest corrected intensity value in the corrected intensity image.

BRIEF DESCRIPTION OF THE DRAWINGS

The disclosure will be described with reference to the accompanying drawings, wherein like numbers reference like elements.

DESCRIPTION OF EXEMPLARY EMBODIMENTS

Hereinafter, preferred embodiments of the disclosure will be described in detail. Note that the embodiments given below are not intended to unduly limit the scope of the invention recited in the appended claims. In addition, not all of the constituent elements described below are essential to the invention.

1. Display Device

Figure 1:
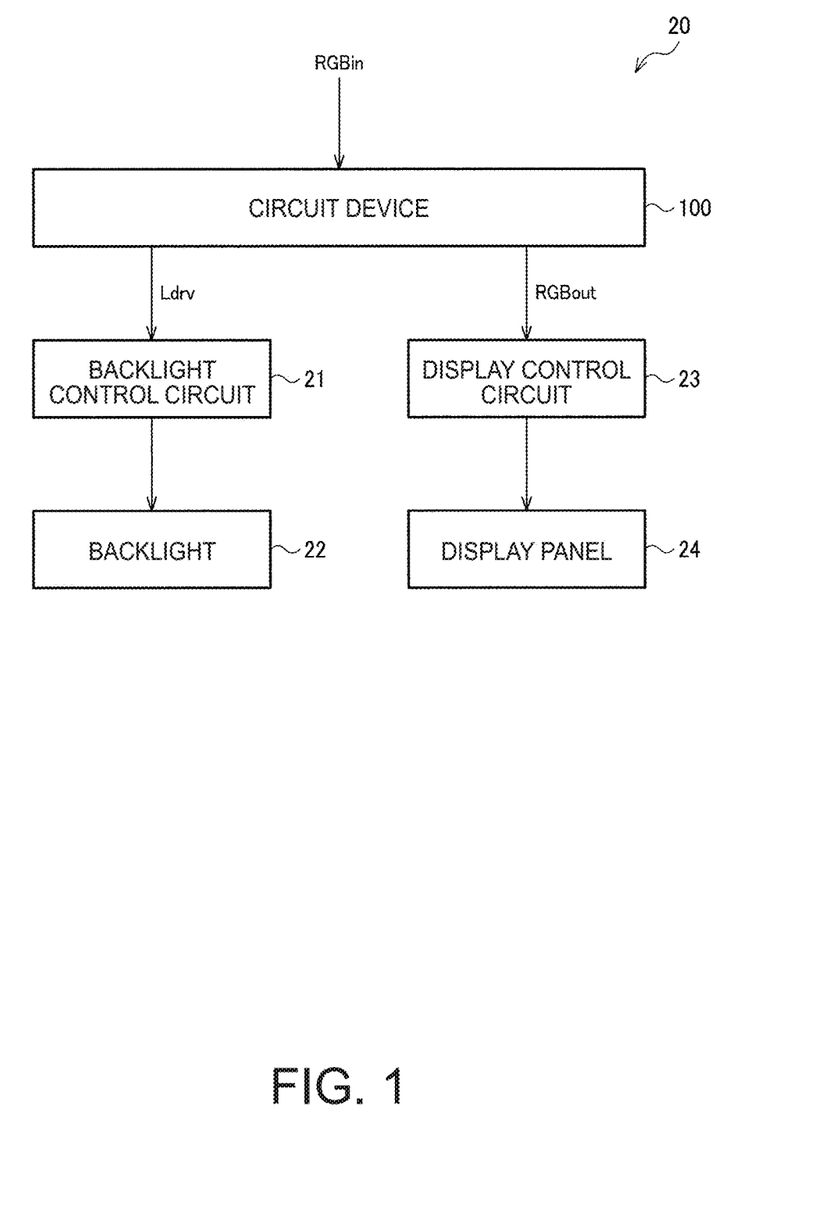
FIG. 1 shows an exemplary configuration of a display device.

FIG. 1 shows an exemplary configuration of a display device 20 that includes a circuit device 100 according to the present embodiment. The display device 20 includes a backlight control circuit 21, a backlight 22, a display control circuit 23, a display panel 24, and the circuit device 100.

Figure 2:
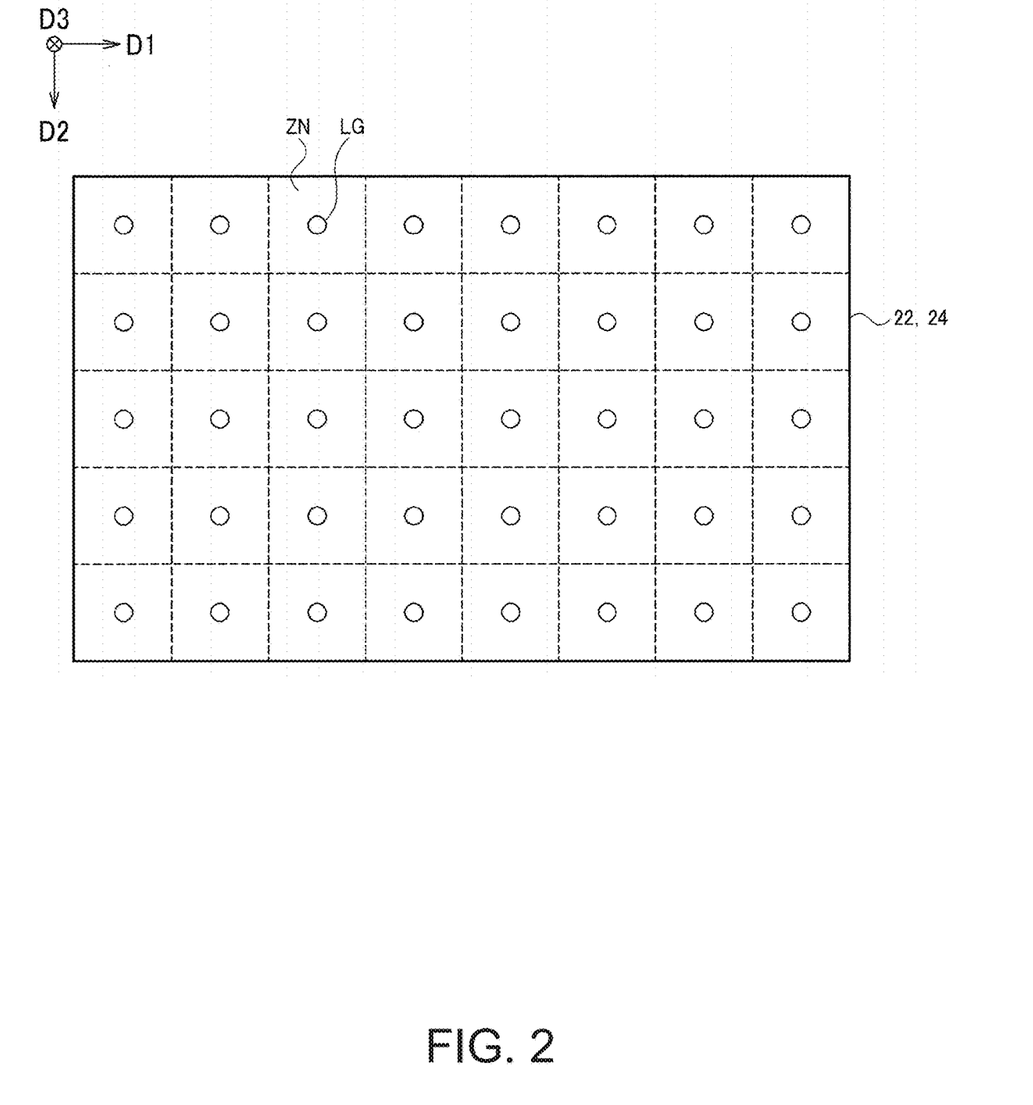
FIG. 2 shows an exemplary configuration of a backlight and a display panel.

FIG. 2 shows an exemplary configuration of the backlight 22 and the display panel 24. In FIG. 2, a direction D1 is the horizontal scanning direction of the display panel 24, and a direction D2 is the vertical scanning direction of the display panel 24. A direction D3 is orthogonal to the directions D1 and D2, and is a direction in which the display panel 24 is seen in a planar view. The backlight 22 is provided on the direction D3 side of the display panel 24, and emits illumination light in the opposite direction to the direction D3, namely toward the display panel 24.

The backlight 22 includes a plurality of light sources LG. FIG. 2 illustrates an example in which 8×5 light sources LG are arranged in a two-dimensional array. Specifically, eight light sources LG are aligned along the direction D1, and five light sources LG are aligned along the direction D2. The light sources LG are LEDs, for example. LED is an abbreviation for Light Emitting Diode. Note that the light sources LG are not limited to LEDs, and may be any light sources in which light amounts are independently controlled, and that are similar to point light sources. A light source that is similar to a point light source refers to a light source LG in which the size of a light emission unit is sufficiently smaller than a display zones ZN corresponding to the light source LG.

The display panel 24 has a pixel array, and, in the pixel array, an area in which a display image is displayed is defined as a display area. The display area is divided into a plurality of display zones ZN. The light sources LG are arranged in correspondence with the display zones ZN. Accordingly, the display zones ZN respectively correspond to the light sources LG. For example, when the display panel 24 is seen in a planar view, a light source LG is arranged at the center of each of the display zones ZN. Note that the arrangement positions of the light sources LG are not limited thereto. In FIG. 2, the display area is divided into 8×5 display zones ZN in correspondence with 8×5 light sources LG. Note that the display zones ZN are used for processing that is performed in the circuit device 100, and there is no boundary between the display zones ZN in a display image that is actually displayed on the display panel 24. The display panel 24 is a panel in which transmissivity of each pixel is controlled in accordance with a display image, and the display image is displayed as a result of the pixels transmitting illumination light of the backlight 22. For example, the display panel 24 is a liquid crystal display panel.

As shown in FIG. 1, the circuit device 100 receives an input image RGBin, and outputs light source driving values Ldry and an output image RGBout based on the input image RGBin. Digital data is input/output as these input image and output image. Accordingly, the input image RGBin and the output image RGBout are image data, and the light source driving values Ldry are digital values. For example, the circuit device 100 is an integrated circuit device referred to as an IC (Integrated Circuit). The circuit device 100 is an IC manufactured by a semiconductor process, and is a semiconductor chip in which circuit elements are formed on a semiconductor substrate.

The backlight control circuit 21 controls the backlight 22 based on the light source driving values Ldrv. Specifically, the circuit device 100 outputs light source driving values in correspondence with the plurality of light sources LG, and the backlight control circuit 21 controls the light amounts of the light sources LG based on the light source driving values. The backlight control circuit 21 is constituted by a plurality of drive circuits that drive the plurality of light sources LG, for example.

The display control circuit 23 performs control so as to display the output image RGBout on the display panel 24. Specifically, the display control circuit 23 outputs control signals of horizontal synchronization and vertical synchronization to the display panel 24, and outputs image signals that are based on the output image RGBout, so as to apply a voltage to each pixel on the display panel 24. Accordingly, transmissivity of each pixel is controlled, and the output image RGBout is displayed on the display panel 24. The display control circuit 23 is a display driver, for example.

Note that the backlight control circuit 21, the display control circuit 23, and the circuit device 100 may be configured as one integrated circuit device.

Figure 3:
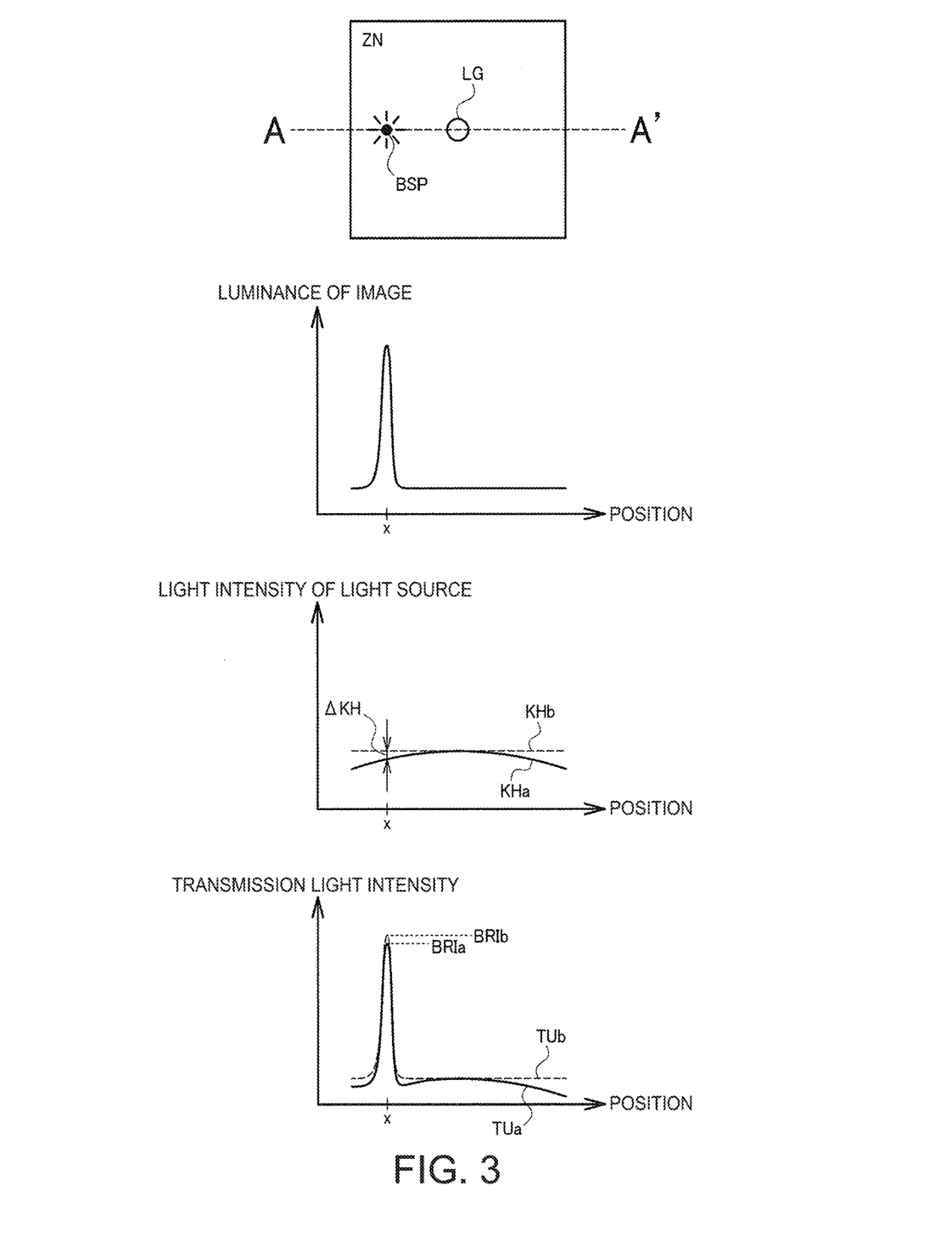
FIG. 3 is a diagram illustrating clipping that occurs due to the PSF of a light source.

Clipping that occurs due to the PSF of each light source LG will be described with reference to FIG. 3. The PSF is also called a "point-spread function", and indicates light intensity distribution of light emitted from one light source LG. Specifically, the PSF is represented as a two-dimensional coefficient matrix that indicates the intensity distribution of light that is emitted from a light source LG and reaches the display panel 24. This light intensity distribution is distribution in which the larger the distance from the light source LG is when the display panel 24 is seen in a planar view, the smaller the intensity becomes. The PSF is a normalized function, which is normalized such that the coefficient of light intensity distribution at the position of the light source LG is 1, for example. Here, a light intensity value indicates the intensity of light at a specific position in the intensity distribution of a light source.

A description will be given with a focus on one display zone ZN and the light source LG provided in correspondence with the display zone ZN, with reference to FIG. 3. Note that the PSF of the light source LG extends to the outside of the corresponding display zone ZN. The diagrams in FIG. 3 are indicated by first to fourth diagrams from the top.

As shown in the first diagram, there is a high luminance portion BSP in the image within the display zone ZN, and the area except for that is defined as a dark portion. Consider a line AA' that passes through the high luminance portion BSP and the light source LG in a planar view of the display panel. The position of the high luminance portion BSP on the line AA' is denoted by x.

The second diagram shows the luminance distribution of the image on the line AA'. The luminance of the image is higher at the position x of the high luminance portion BSP than in the surrounding portion thereof, namely the dark portion.

The third diagram shows light intensity distribution on the line AA'. Here, the light intensity distribution is not represented as a normalized PSF, and indicates the intensity distribution of light that is actually emitted by the light source. "KHa" indicated by a solid line indicates light intensity distribution in which the PSF is taken into consideration, and "KHb" indicated by a dotted line indicates light intensity distribution when it is assumed that the display zone ZN is illuminated with a uniform light intensity. Since the high luminance portion BSP is separated from the light source LG, the light intensity value at the position x in the light intensity distribution KHa is smaller than the light intensity value at the position x in the light intensity distribution KHb by "ΔKH".

The fourth diagram shows the transmission light intensity distribution on the line AA'. Transmission light refers to light that has passed through pixels of the display panel. The pixel transmissivity is controlled in accordance with the luminance of the image, and thus the transmission light intensity depends on the luminance distribution of the image and the light intensity distribution of the light source. "TUa" indicates the transmission light intensity distribution when the PSF is taken into consideration, and "TUb" indicates the transmission light intensity distribution when it is assumed that the light intensity distribution is uniform. As shown in the fourth diagram, a transmission light intensity BRIa at the position x in the transmission light intensity distribution TUa is smaller than a transmission light intensity BRIb at the position x in the transmission light intensity distribution TUb. This is because the light intensity of the light source attenuates at the position x by ΔKH due to the PSF, as described with reference to the third diagram.

As described above, due to the PSF of the light source, the transmission light intensity BRIa of the high luminance portion BSP is smaller than the transmission light intensity BRIb that is a transmission light intensity to be obtained when the light intensity distribution is uniform. Accordingly, due to the PSF, the brightness of the high luminance portion BSP is clipped. Therefore, the contrast between the high luminance portion BSP and the dark portion becomes smaller than the contrast when the light intensity distribution is uniform, and there is the issue that the contrast becomes insufficient due to the PSF.

2. Circuit Device

Figure 4:
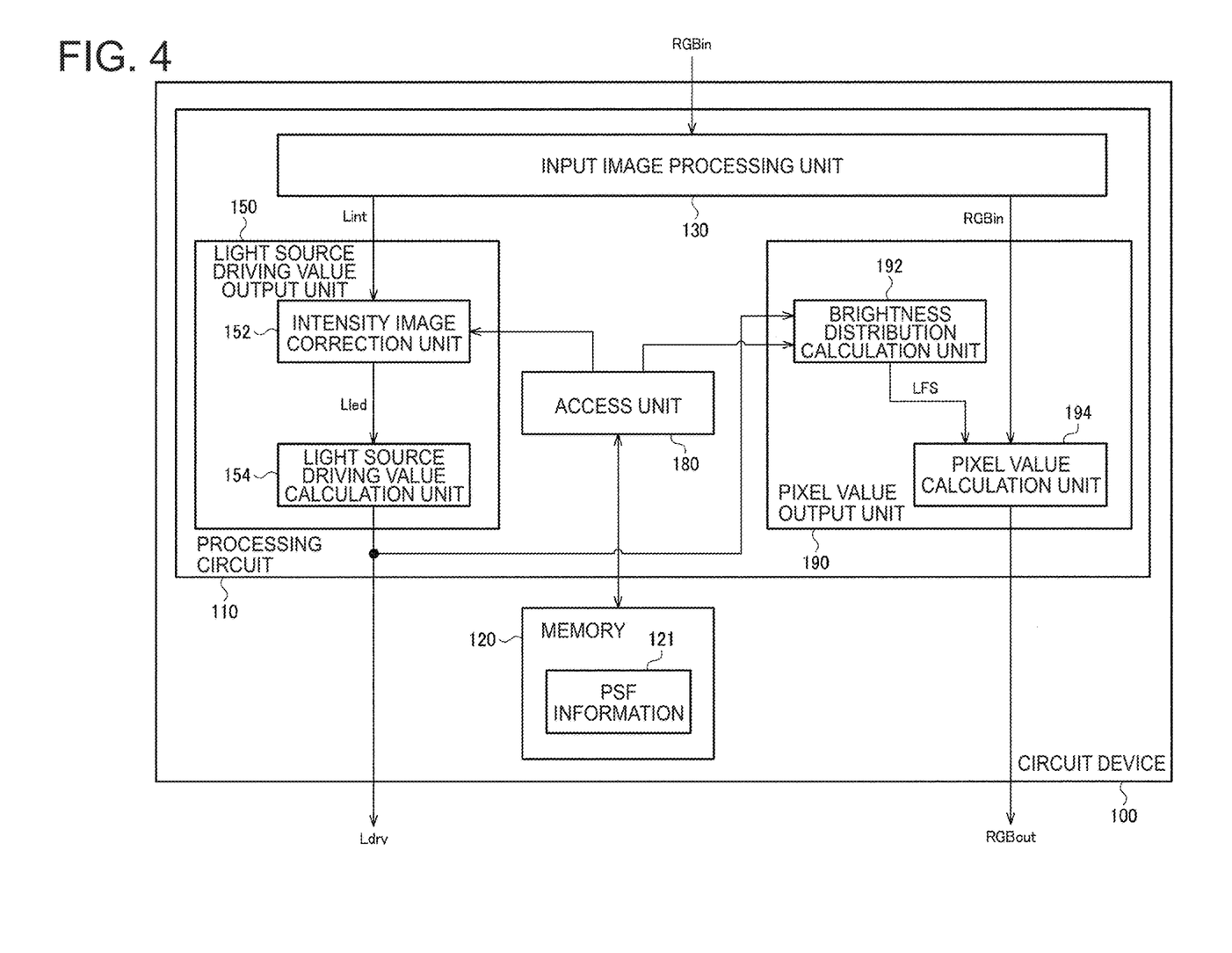
FIG. 4 shows an exemplary configuration of a circuit device.

FIG. 4 shows an exemplary configuration of the circuit device 100 according to the present embodiment. The circuit device 100 includes a processing circuit 110 and a memory 120.

The memory 120 stores PSF information 121. The PSF information 121 is information that indicates the light intensity distribution of the PSF, and will be described later in detail with reference to FIG. 6 and the like. The memory 120 is a semiconductor memory such as a RAM or a non-volatile memory. The PSF information 121 may be stored in the memory 120 that is a non-volatile memory, in advance, or may also be stored in the memory 120 that is a RAM, from a processing device or the like outside of the circuit device 100 after the circuit device 100 is started.

The processing circuit 110 outputs the light source driving values Ldry and the output image RGBout based on the input image RGBin and the PSF information 121. The processing circuit 110 is a logic circuit that performs digital processing. Alternatively, the processing circuit 110 may also be a processor such as a CPU, microcomputer or DSP. The processing circuit 110 includes an input image processing unit 130, a light source driving value output unit 150, a pixel value output unit 190, and an access unit 180. Each of these constituent elements may be configured as an individual circuit. Alternatively, functions of these constituent elements may also be realized as a result of the processor executing a program in which the functions of the constituent elements are written.

The input image RGBin is input to the input image processing unit 130, and the input image processing unit 130 obtains an intensity image Lint based on the input image RGBin. The input image RGBin is two-dimensional matrix data, in which pieces of data corresponding to the respective pixels include luminance values of a first color component, a second color component, and a third color component. A luminance value is also called a "pixel value", and is a value that indicates the luminance of a color component in the image data. Note that, hereinafter, the first color component is a red component, the second color component is a green component, and the third color component is a blue component.

The input image processing unit 130 obtains the intensity image Lint based on Expression 1 below. "Lint(X,Y)" indicates an intensity value at a pixel position (X,Y). "X" indicates a position in the horizontal scanning direction, and "Y" indicates a position in the vertical scanning direction. "Lred(X,Y)" indicates a luminance value of the red component at (X,Y), "Lgreen(X,Y)" indicates a luminance value of the green component at (X,Y), and "Lblue(X,Y)" indicates a luminance value of the blue component at (X,Y). "max" indicates computation for selecting the largest value among the luminance values of the red component, the green component, and the blue component. As described above, an intensity value is a value at a specific position in the intensity image. In other words, it can also be said that an intensity image is defined as a group of intensity values in the entire image.

[Math. 1]

$$Lint(X,Y)=\max(Lred(X,Y), Lgreen(X,Y), Lblue(X,Y)) \quad (1)$$

The intensity image Lint obtained based on Expression 1 above is two-dimensional matrix data that has the same number of pixels as the input image RGBin. The intensity image Lint is obtained for the entire input image RGBin, not for one display zone ZN. Each of the pixels of the intensity image Lint has one intensity value only, and the intensity value is an index that indicates the light intensity of a light source required for realizing of the luminance of the pixel for display. Accordingly, it is requested to make the light intensity larger for a larger intensity value.

The light source driving value output unit 150 outputs the light source driving values Ldry of the plurality of light sources LG, based on the intensity image Lint and the PSF information 121. The intensity image Lint is obtained for the entire input image RGBin, but a light source driving value Ldry for one light source LG is obtained based on the intensity image Lint within the display zone ZN corresponding to the light source LG.

Figure 5:
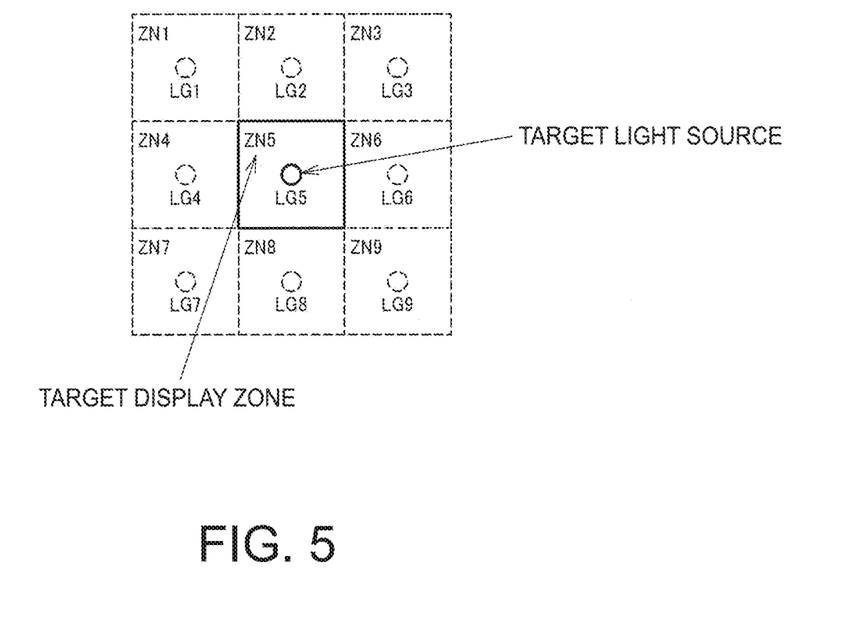
FIG. 5 is a diagram illustrating a target display zone and a target light source.

As shown in FIG. 5, a display zone that is a computation target is referred to as a "target display zone". In FIG. 5, the target display zone is ZN5. The target display zone ZN5 is any one of the plurality of display zones ZN shown in FIG. 2. Display zones ZN1 to ZN4 and ZN6 to ZN9 are display zones surrounding the target display zone ZN5. The light source provided for the target display zone ZN5 is referred to as a "target light source LG5". Also, light sources LG1 to LG4 and LG6 to LG9 are provided for the surrounding display zones ZN1 to ZN4 and ZN6 to ZN9. The light source driving value output unit 150 obtains the light source driving value Ldry of the target light source LG5 using the intensity image Lint in the target display zone ZN5.

For example, the light source driving value output unit 150 sequentially selects the plurality of light sources LG shown in FIG. 2 as a target light source, and sequentially obtains the light source driving values Ldry of the selected light sources, so as to obtain the light source driving value Ldry for all of the plurality of light sources LG. Operations of the light source driving value output unit 150 will be described below, using, as an example, the target display zone ZN5 and the target light source LG5 in FIG. 5.

The light source driving value output unit 150 includes an intensity image correction unit 152 and a light source driving value calculation unit 154.

The intensity image correction unit 152 obtains a corrected intensity image Lled by correcting the intensity image Lint in the target display zone ZN5 based on the light intensity distribution of the target light source LG5. Specifically, the intensity image correction unit 152 obtains the corrected intensity image Lled based on Expression 2 below. "$(X,Y)_{ZN5}$" indicates a pixel position within the target display zone ZN5. "fPSF" indicates the PSF of the target light source LG5. "$fPSF(X,Y)_{ZN5}$" indicates a coefficient of the PSF (light intensity distribution) at the pixel position $(X,Y)_{ZN5}$. "Lled$(X,Y)_{ZN5}$" indicates a value obtained by correcting the intensity value of the intensity image Lint due to the PSF, and this is referred to as a "corrected intensity value".

[Math. 2]

$$Lled(X, Y)_{ZN5} = \frac{Lint(X, Y)_{ZN5}}{fPSF(X, Y)_{ZN5}} \quad (2)$$

Figure 6:
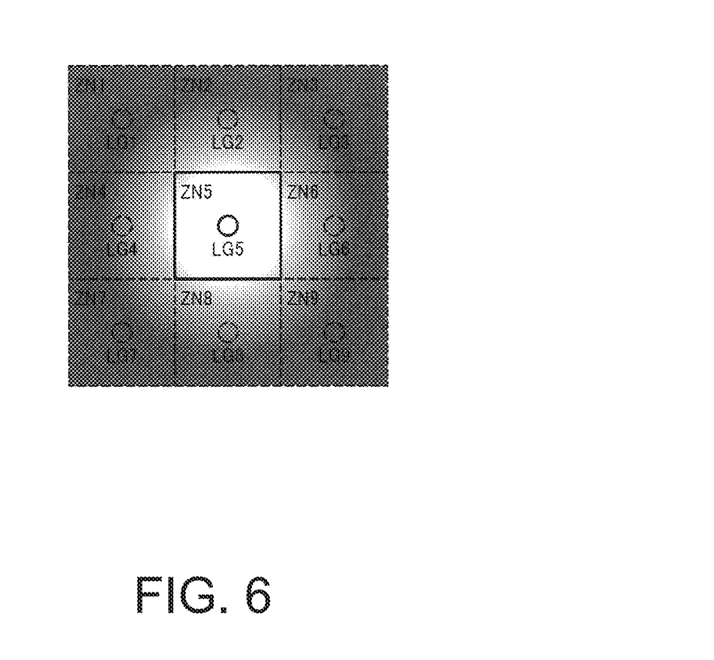
FIG. 6 shows an example of light intensity distribution of a PSF.

FIG. 6 shows an example of the light intensity distribution of the PSF. In FIG. 6, the light intensity distribution is indicated by gradation, and a whiter portion represents a larger coefficient of the light intensity distribution. The access unit 180 reads out PSF information corresponding to the target light source LG5 from the memory 120, and outputs the PSF information to the intensity image correction unit 152. Note that the PSF information may be common to a plurality of light sources LG, or may be individually set. The PSF information is two-dimensional matrix data in which light intensity distribution is defined in an area of a predetermined size. The size represents (the number of pixels in the horizontal scanning direction)×(the number of pixels in the vertical scanning direction). In FIG. 6, the size of the PSF corresponds to 3×3 display zones, and the center of the PSF is positioned at the position of the light source LG5. "fPSF$(X,Y)_{ZN5}$" in Expression 2 above indicates a coefficient of light intensity distribution at the pixel position $(X,Y)_{ZN5}$ when the PSF is arranged as in FIG. 6.

Note that the intensity image correction unit 152 may calculate a corrected intensity image after the size of each display zone is calculated. Specifically, the PSF information 121 includes size information of the display zone, and the intensity image correction unit 152 calculates the size of the display zone using the size information. It suffices for the size information of the display zone to be information indicating the size of the display zone, and, for example, the size information may indicate the display zone itself, or the size of the PSF and the number of division of the PSF. For example, when the number of division of the PSF is 3×3, a size obtained by dividing the size of the PSF by 3×3 is the size of each display zone. The intensity image correction unit 152 divides the display area into a plurality of display zones using the obtained size of each display zone.

The light source driving value calculation unit 154 obtains the light source driving value Ldry based on the largest corrected intensity value in the corrected intensity image Lled. Specifically, a light source driving value is obtained based on Expression 3 below. "Ldrv[LG5]" indicates a light source driving value of the target light source LG5. "max" indicates computation for selecting the largest value among corrected intensity values Lled$(X,Y)_{ZN5}$ in the target display zone ZN5.

[Math. 3]

$$Ldrv[LG5]=\max(Lled(X,Y)_{ZN5}) \quad (3)$$

Figure 7:
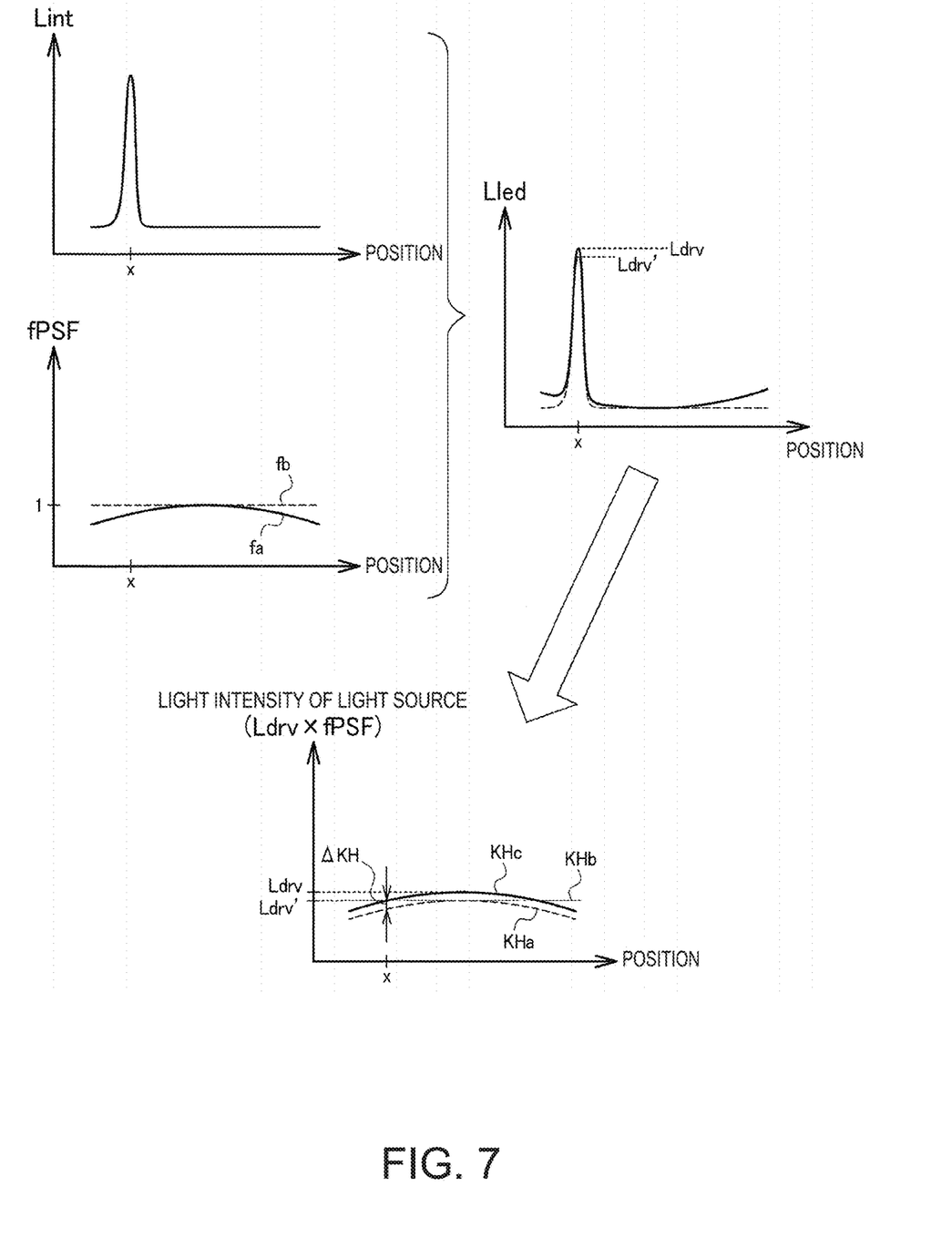
FIG. 7 is a diagram illustrating operations of a light source driving value calculation unit.

FIG. 7 is a diagram illustrating operations of the light source driving value calculation unit 154. Assume that the high luminance portion BSP is positioned at the position x on the line AA' similarly to the first diagram in FIG. 3.

In the intensity image Lint calculated by the input image processing unit 130, the intensity value is the largest at the position x. In the light intensity distribution fPSF of the PSF, as indicated by "fa", the light intensity decreases in a peripheral portion than at the center of a display zone. Here, normalization is performed such that the largest value of fPSF is 1. "fb" indicated by a dotted line indicates the light intensity distribution when it is assumed that the light intensity is constant within the display zone.

The intensity image correction unit 152 obtains the corrected intensity image Lled by dividing the intensity image Lint by the light intensity distribution fPSF, as described based on Expression 2 above. The light source driving value calculation unit 154 obtains the largest corrected intensity value in the corrected intensity image Lled as the light source driving value Ldrv, as described based on Expression 3 above. The corrected intensity image Lled is obtained by correcting the intensity image using the PSF, and thus a larger value is obtained than the light source driving value Ldrv' when the intensity image Lint is not corrected using the PSF.

The light intensity distribution of light that is emitted by a light source corresponds to distribution obtained by multiplying the light source driving value Ldry by the light intensity distribution fPSF of the PSF. "KHa" indicated by a dotted line indicates light intensity distribution when the light source driving value Ldrv' is used, and corresponds to "KHa" in the third diagram in FIG. 3. Accordingly, KHa indicates the light intensity distribution of light emitted from a light source when the intensity image Lint has not been corrected using the PSF. "Ldrv'" that indicates the largest value of KHa corresponds to "KHb" in the third diagram in FIG. 3, and is a light intensity when it is assumed that the light intensity is constant. The light intensity value of KHa at the position x is smaller than this Ldrv' by "ΔKH".

"KHc" indicated by a solid line indicates the light intensity distribution when the light source driving value Ldry in which the PSF is taken into consideration is used. Since Ldrv>Ldrv' as described above, the light intensity value of KHc at the position x is larger than the light intensity value of KHa. This increase amount is indicated by ΔKH, and the light intensity value of KHc at the position x is Ldrv'. Accordingly, the light intensity when it is assumed that the light intensity is constant is obtained at the position x.

As described with reference to FIG. 3, there is the issue that, as a result of the light intensity value decreasing by ΔKH at the position x under the influence of the PSF, the high luminance portion BSP is clipped, but, according to the present embodiment, as described above, the light source driving value Ldry is obtained in consideration of the PSF, and thus, the decrease amount ΔKH of the light intensity value at the position x is cancelled. Accordingly, desired luminance is obtained without the high luminance portion BSP being clipped, and thus the contrast does not degrade.

On the other hand, if the light source driving value Ldry is set too high, the luminance of the light source becomes high, and the brightness of the dark portion increases due to light leakage to the dark portion or the like, thereby degrading the contrast. Accordingly, in order to improve the contrast-improving effect of local dimming, it is desired to make the light source luminance as low as possible. According to the present embodiment, it is possible to secure a light intensity required for the high luminance portion BSP while maintaining the light source luminance to its minimum within a range in which the light intensity can be secured. Accordingly, it is possible to avoid clipping of the high luminance portion BSP, and suppress an increase in the brightness of the dark portion, and thus it is possible to improve the contrast-improving effect of local dimming.

Next, the pixel value output unit 190 will be described. The pixel value output unit 190 corrects pixel values of the input image RGBin based on the light source driving values Ldrv, and outputs the corrected pixel values. An image constituted by the corrected pixel values is defined as the output image RGBout. The pixel value output unit 190 includes a brightness distribution calculation unit 192 and a pixel value calculation unit 194.

The brightness distribution calculation unit 192 obtains brightness distribution LFS of the backlight 22 illuminating the display area, based on the light source driving value Ldry obtained for each of the display zones and the light intensity distribution of the PSF in the display zone. A case will be described below in which the brightness distribution LFS in the target display zone ZN5 is obtained.

Figure 8:
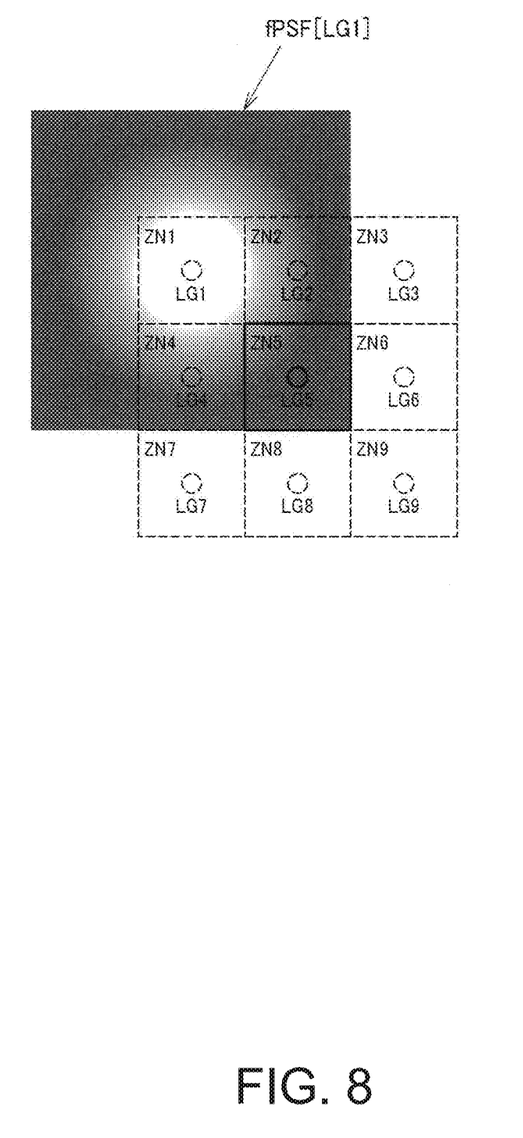
FIG. 8 is a diagram illustrating operations of a brightness distribution calculation unit.

FIG. 8 is a diagram illustrating operations of the brightness distribution calculation unit 192. The brightness distribution calculation unit 192 obtains the brightness distribution LFS in consideration of not only the target light source LG1 to LG4 and LG6 to LG9 surrounding the target light source LG5. Specifically, the brightness distribution calculation unit 192 obtains the brightness distribution LFS based on Expression 4 below.

[Math. 4]

$$LFS(X, Y)_{ZN5} \sum_{i=1}^{9} fPSF[LGi](X, Y)_{ZN5} \times Ldrv[LGi] \quad (4)$$

In Expression 4 above, "LFS(X,Y)$_{ZN5}$" indicates the brightness at the position (X,Y) of the target display zone ZN5. "fPSF[LGi]" indicates the light intensity distribution of the PSF of a light source LGi. The access unit 180 reads out fPSF[LGi] as the PSF information 121 from the memory 120, and outputs fPSF[LGi] to the brightness distribution calculation unit 192. "Ldrv[LGi]" indicates a light source driving value for the light sources LGi.

FIG. 8 shows fPSF[LG1] as an example. "fPSF[LG1](X, Y)$_{ZN5}$" indicates a coefficient of the light intensity distribution at the pixel position (X,Y)$_{ZN5}$ when LG1 that has light intensity distribution in which the PSF is used as a coefficient is the light source, as shown in FIG. 8. Here, an example of i=1 has been described, but the same applies when i=2 to 9. Note that, in FIG. 8 and Expression 4 above, 3×3 light sources centered on the target light source LG5 are taken into consideration, but the number of light sources that are taken into consideration when obtaining the brightness distribution LFS is not limited to 3×3.

The pixel value calculation unit 194 corrects the pixel values of the input image RGBin based on the brightness distribution LFS, and outputs the corrected pixel values as pixel values of the output image RGBout. This correction is performed on the entire input image RGBin, not the target display zone ZN5. Specifically, the pixel value calculation unit 194 obtains the output image RGBout based on Expression 5 below.

[Math. 5]

$$RGBout(X, Y) = \frac{RGBin(X, Y)}{LFS(X, Y)} \quad (5)$$

In Expression 5 above, "RGBout(X,Y)" indicates the pixel value at the position (X,Y) of the output image RGBout. "RGBin(X,Y)" indicates the pixel value at the position (X,Y) of the input image RGBin. "LFS(X,Y)" indicates the brightness at the position (X,Y) of the brightness distribution LFS. Note that RGBin(X,Y) includes the luminance value Lred(X,Y) of the red component, the luminance value Lgreen(X,Y) of the green component, and the luminance value Lblue(X,Y) of the blue component. Division in Expression 5 above is executed for each of the color components. Accordingly, RGBout(X,Y) includes the luminance value Lred(X,Y)/LFS(X,Y) of the red component, the luminance value Lgreen(X,Y)/LFS(X,Y) of the green component, and the luminance value Lblue(X,Y)/LFS(X,Y) of the blue component.

As described above, the output image RGBout, in which light unevenness when the backlight 22 illuminates the display panel 24 is cancelled by correcting pixel values using the brightness distribution LFS, is obtained. Accordingly, when the output image RGBout is displayed on the display panel 24, and the display panel 24 is illuminated by the backlight 22, the transmission light intensity is represented as RGBout×LFS=(RGBin/LFS)×LFS=RGBin. Accordingly, a display image in which light unevenness of the backlight 22 is canceled is displayed.

Note that, in Expression 4 above, the brightness distribution calculation unit 192 obtains the brightness distribution LFS with the same resolution as the input image RGBin, but the brightness distribution calculation unit 192 may obtain the brightness distribution LFS with a resolution that is lower than the resolution of the input image RGBin. For example, when n is an integer of 2 or larger, and the target display zone ZN5 is set to 10n×10n pixels, the brightness distribution LFS may be obtained for the n×n pixels. In this case, the resolution of the brightness distribution LFS is 1/10 of the resolution of the input image RGBin both in the horizontal scanning direction and the vertical scanning direction. For example, it is sufficient that PSF information with a resolution that is 1/10 of the resolution of the input image RGBin is stored in the memory 120, and the brightness distribution LFS is calculated using the PSF information.

3. Control Method, Electronic Apparatus, and Mobile Body

Figure 9:
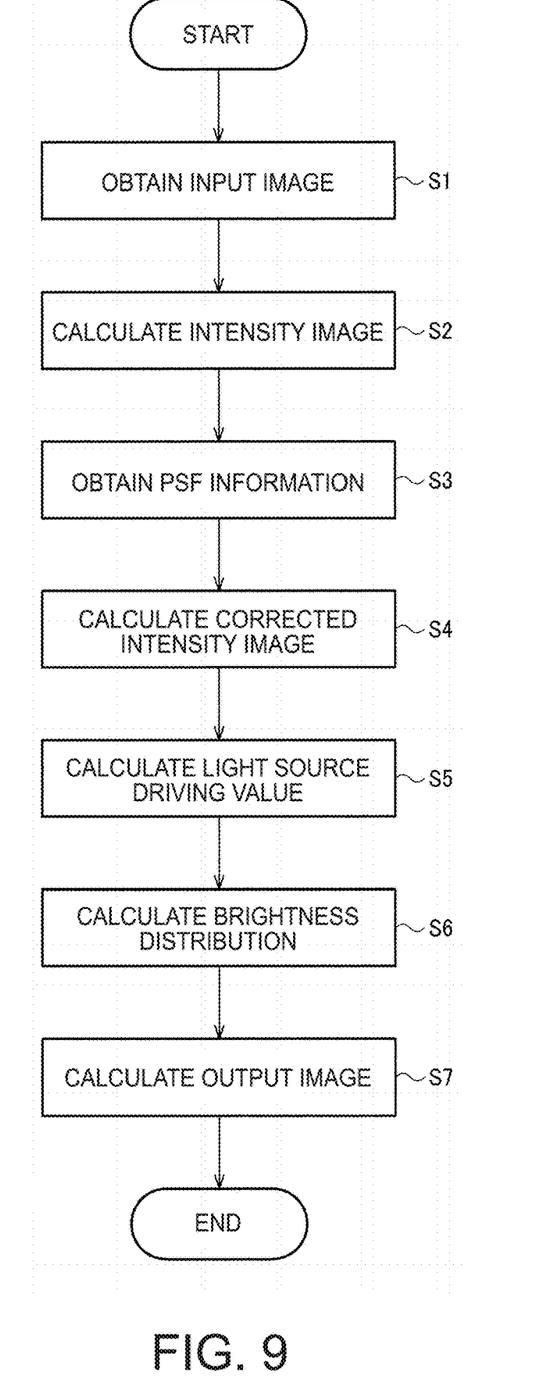
FIG. 9 is a flowchart showing a procedure of a control method.

FIG. 9 is a flowchart showing a procedure of a control method according to the present embodiment.

In step S1, the input image processing unit 130 obtains the input image RGBin. In step S2, the input image processing unit 130 obtains the intensity image Lint based on the input image RGBin. A technique for calculating the intensity image Lint has been described based on Expression 1 above. In step S3, the access unit 180 obtains the PSF information 121 from the memory 120, and then outputs the PSF information 121 to the intensity image correction unit 152 and the brightness distribution calculation unit 192. In step S4, the intensity image correction unit 152 obtains the corrected intensity image Lled based on the intensity image Lint and the PSF information 121. A technique for calculating the corrected intensity image Lled has been described based on Expression 2 above. In step S5, the light source driving value calculation unit 154 obtains the light source driving value Ldry based on the corrected intensity image Lled. A technique for calculating the light source driving value Ldry has been described based on Expression 3 above. In step S6, the brightness distribution calculation unit 192 obtains the brightness distribution LFS based on the light source driving value Ldry and the PSF information 121. A technique for calculating the brightness distribution LFS has been described based on Expression 4 above. In step S7, the pixel value calculation unit 194 obtains the output image RGBout based on the input image RGBin and the brightness distribution LFS. A technique for calculating the output image RGBout has been described based on Expression 5 above.

Figure 10:
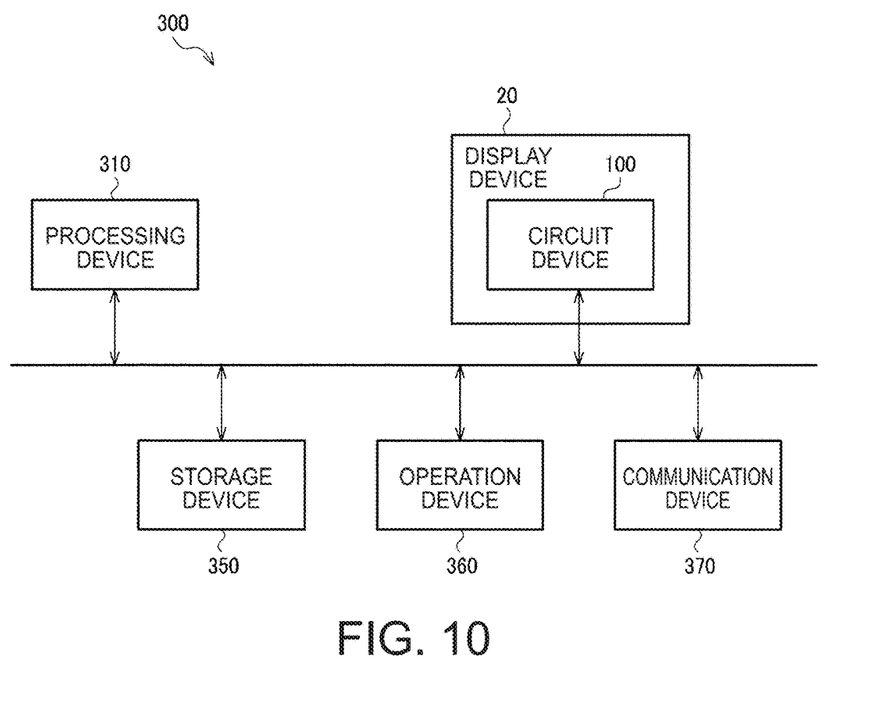
FIG. 10 shows an exemplary configuration of an electronic apparatus.

FIG. 10 shows an exemplary configuration of an electronic apparatus 300 including the circuit device 100 of the present embodiment. The electronic apparatus 300 includes a processing device 310, a display device 20, a storage device 350, an operation device 360, and a communication device 370. The display device 20 includes the circuit device 100. The processing device 310 is a processor such as a CPU or a microcomputer. Various apparatuses such as on-board electronic apparatuses, mobile information processing terminals, mobile gaming terminals, display terminals for plant facilities and the like, display devices installed in robots, and information processing devices can be envisioned as the electronic apparatus 300. The on-board electronic apparatuses are meter panels and the like.

The processing device 310 transfers image data stored in the storage device 350 or image data received by the communication device 370 to the circuit device 100. The circuit device 100 obtains light source driving values and an output image based on the received image data that is an input image, outputs the light source driving values to a backlight control circuit, and outputs the output image to a display control circuit. The backlight control circuit controls the luminance of light sources of the backlight based on the light source driving values, and the display control circuit performs control so as to display the output image on a display panel. The storage device 350 is a memory, a hard disk drive, an optical disk drive, or the like. The storage device 350 temporally stores image data, or functions as a work memory of the processing device 310. The operation device 360 is a device for a user to operate the electronic apparatus 300, and may be buttons, a touch panel, or a keyboard, for example. The communication device 370 is a device that performs wired communication or wireless communication, for example. The wired communication is communication that is performed via a LAN or a USB, for example. The wireless communication is communication that is performed via a wireless LAN, wireless near-field communication, or the like.

Figure 11:
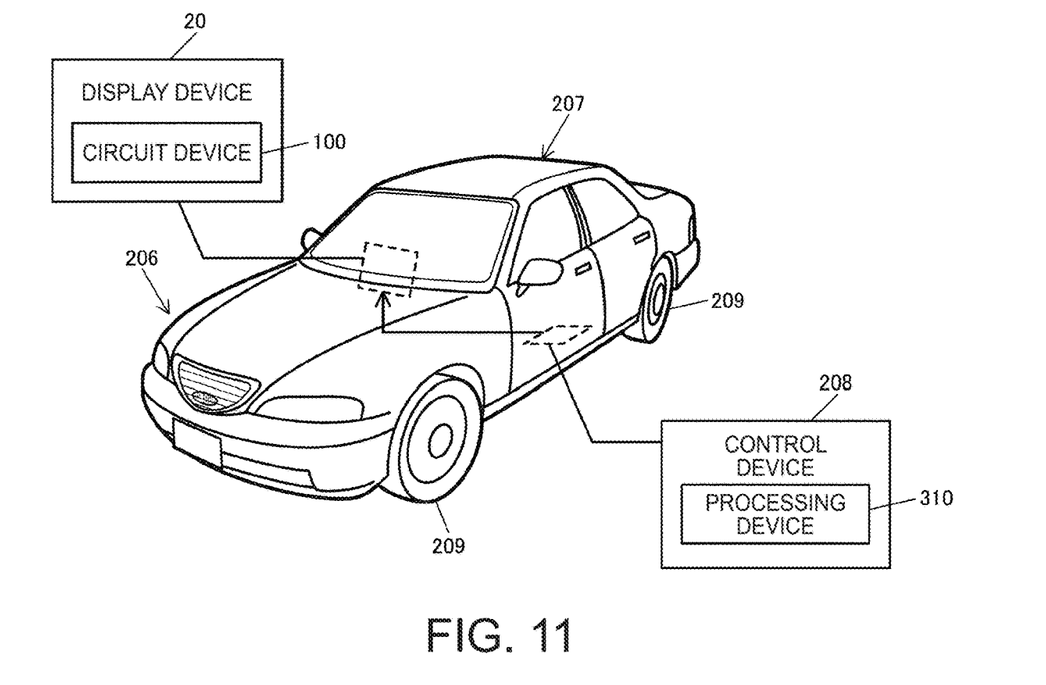
FIG. 11 shows an example of a mobile body.

FIG. 11 shows an example of a mobile body including the circuit device 100 of the present embodiment. The mobile body includes the circuit device 100 and a processing device 310 that transmits image data to the circuit device 100. The mobile body includes the display device 20 and a control device 208. The control device 208 is an ECU (Electronic Control Unit), and the processing device 310 is incorporated into the ECU. The circuit device 100 is incorporated into the display device 20. The circuit device 100 of the present embodiment can be incorporated into various mobile bodies such as cars, airplanes, motorcycles, bicycles, and ships. The mobile body is an apparatus or a device that includes a drive mechanism such as an engine or a motor, a steering mechanism such as a steering wheel or a rudder, and various electronic apparatuses, for example, and moves on the ground, in the air, and on the sea. FIG. 11 schematically shows an automobile 206 as a specific example of the mobile body. The control device 208 controls the hardness of the suspension, and controls the brake of each wheel 209, in accordance with the orientation of an automobile body 207, for example. The display device 20 functions as the meter panel of the automobile 206, for example.

The above-described circuit device according to the present embodiment is used for a display device. The display device includes a display panel and a backlight provided with a plurality of light sources. The circuit device includes a light source driving value output unit that outputs light source driving values of the plurality of light sources, and a pixel value output unit that corrects pixel values of an input image based on the light source driving values, and outputs the corrected pixel values. The plurality of light sources are provided in correspondence with a plurality of display zones obtained as a result of dividing a display area of the display panel. The light source driving value output unit obtains a corrected intensity image by correcting an intensity image of the input image in a target display zone out of the plurality of display zones based on a light intensity distribution of a light source corresponding to the target display zone, and obtains a light source driving value based on the largest corrected intensity value in the corrected intensity image.

According to the present embodiment, the intensity image is corrected based on the light intensity distribution of a light source, and a light source driving value is obtained based on the largest corrected intensity value in the corrected intensity image. Accordingly, even when the light intensity decreases in a peripheral portion of the display zone under the influence of a PSF, the light source driving value is obtained based on the corrected intensity image in which the amount of decrease has been corrected, and thus clipping that occurs under the influence of the PSF is reduced.

In addition, according to the present embodiment, the light source driving value output unit may correct intensity values of pixels of the intensity image based on coefficients of the light intensity distribution for the pixels, and, as a result, obtain corrected intensity values of pixels of the corrected intensity image.

The intensity image includes intensity values in which the light intensity distribution is not taken into consideration, and thus, if light source driving values are obtained based on the intensity image, there is the possibility that clipping will occur. According to the present embodiment, as a result of the intensity values of the pixels of the intensity image being corrected based on the coefficients of the pixels of the light intensity distribution, a corrected intensity image in which the light intensity distribution is taken into consideration is obtained. As a result of the light source driving values being obtained based on the corrected intensity image, clipping is reduced.

In addition, according to the present embodiment, the intensity value of each of the pixels of the intensity image may be the largest value among luminance values of a first color component, a second color component, and a third color component in the pixel of the input image.

The intensity value of each of the pixels is an index indicating a light intensity required for the pixel. The higher the luminance value of a color component is, the larger the light intensity required for the color component becomes, and thus, as a result of the largest value among the luminance values of the first color component, the second color component, and the third color component being selected as an intensity value, the intensity value of the pixel is obtained.

In addition, according to the present embodiment, the circuit device may include an input image processing unit. The input image processing unit may receive the input image, and obtain the intensity image based on the input image.

According to the present embodiment, as a result of the input image processing unit obtaining the intensity image based on the input image, an intensity image correction unit can correct the intensity image, and obtain a corrected intensity image.

In addition, according to the present embodiment, the pixel value output unit may obtain a brightness distribution of the backlight illuminating the display area, based on the light source driving values obtained for the respective display zones and the light intensity distributions in the display zones.

Each of the display zones is illuminated by light from not only a light source corresponding to the display zone, but also light sources corresponding to display zones surrounding the display zone. According to the present embodiment, as a result of brightness distribution being obtained based on the light source driving values obtained for the respective display zones and light intensity distributions of the display zones, the brightness distribution of illumination of the display area is obtained.

In addition, according to the present embodiment, the pixel value output unit may correct pixel values of the input image based on the brightness distribution, and output the corrected pixel values as pixel values of an output image.

In local dimming, a plurality of light sources are arranged, and the light sources have light intensity distributions due to PSF, and thus light unevenness occurs in illumination light that illuminates the display panel. According to the present embodiment, as a result of the pixel values of the input image being corrected based on the brightness distribution, an output image in which light unevenness is cancelled is obtained.

In addition, according to the present embodiment, the pixel value output unit may obtain the brightness distribution with a lower resolution than a resolution of the input image.

According to the present embodiment, as a result of the brightness distribution being obtained with a lower resolution than the resolution of the input image, a processing load for brightness distribution calculation is reduced.

In addition, according to the present embodiment, the circuit device may include a memory that stores the light intensity distribution. The light source driving value output unit may correct the intensity image based on the light intensity distribution stored in the memory.

According to the present embodiment, the light intensity distribution can be stored in the memory in advance, or can be written in the memory from the outside of the circuit device. In addition, as a result of the intensity image being corrected based on the light intensity distribution stored in the memory, clipping in local dimming can be reduced. The light intensity distribution of a PSF varies according to the model of the light source or individual differences from other light sources, and thus it is possible to cope with the model of the light source or individual differences from other light sources by storing, in the memory, light intensity distribution that depends on such variations.

In addition, according to the present embodiment, the plurality of light sources may be LEDs. The display panel may be a liquid crystal display panel.

In addition, a display device according to the present embodiment includes the above-described circuit device, the backlight, and the display panel.

In addition, an electronic apparatus according to the present embodiment includes the above-described circuit device.

In addition, a mobile body according to the present embodiment includes the above-described circuit device.

In addition, a control method according to the present embodiment is a control method of a display device. The display device includes a display panel and a backlight provided with a plurality of light sources. The plurality of light sources are provided in correspondence with a plurality of display zones obtained as a result of dividing a display area of the display panel. In the control method, a corrected intensity image is obtained by correcting an intensity image of an input image in a target display zone out of the plurality of display zones based on a light intensity distribution of a light source corresponding to the target display zone. In the control method, a light source driving value is obtained based on a corrected intensity value of a pixel that is the largest in the corrected intensity image. In the control method, pixel values of the input image are corrected based on the light source driving value, and the corrected pixel values are output.

Note that although an embodiment has been described in detail above, a person skilled in the art will readily appreciate that it is possible to implement numerous variations and modifications that do not depart substantially from the novel aspects and effect of the disclosure. Accordingly, all such variations and modifications are also to be included within the scope of the disclosure. For example, terms that are used within the description or drawings at least once together with broader terms or alternative synonymous terms can be replaced by those other terms at other locations as well within the description or drawings. Also, all combinations of the embodiment and variations are also encompassed in the range of the disclosure. Moreover, the configuration, operation, and the like of the circuit device, the display device, the electronic apparatus, the mobile body, and the like, as well as the control method are not limited to those described in the present embodiment, and various modifications are possible.

What is claimed is:

1. A circuit device that is used for a display device that includes a display panel and a backlight provided with a plurality of light sources, the circuit device comprising: a memory configured to store a program; and a processor configured to execute the program so as to:

receive an input image corresponding to a plurality of pixels of a first zone of the display panel, the first zone being emitted by a light from a first light source of the plurality of light sources, the first light source being driven by a first light source initial driving value;

obtain a plurality of intensity values corresponding to the plurality of pixels of the first zone;

receive a designed light intensity distribution value of the first light source of the plurality of light sources;

divide the plurality of intensity values by the designed light intensity distribution value to obtain a corrected plurality of intensity values;

obtain a largest value of the corrected plurality of intensity values, the first light source initial driving value of the first light source being changed to a first light source corrected driving value corresponding to the largest value of the corrected plurality of intensity values;

correct a first part of the input image by driving the first light source with the first light corrected driving value, the first part corresponding to an image displayed on the first zone of the display panel; and output an output image including the corrected first part to display the output image on the display panel and drive the plurality of light sources by a driving value including the first light source corrected driving value.

2. The circuit device according to claim 1, wherein the plurality of intensity values of each pixel of the plurality of pixels of the input image are the largest luminance values of a first color component, a second color component, and a third color component in the each pixel of the plurality of pixels of the input image.

3. The circuit device according to claim 1, wherein the processor is configured to obtain a brightness distribution of the backlight illuminating the first zone of the display panel based on the first light source corrected driving value and the designated light intensity distribution value.

4. The circuit device according to claim 3, wherein the processor is configured to correct pixel values of the plurality of pixels based on the brightness distribution and output the output image having the corrected pixel values of the plurality of pixels.

5. The circuit device according to claim 3, wherein the processor is configured to obtain the brightness distribution with a lower resolution than a resolution of the input image.

6. The circuit device according to claim 1, wherein the memory is configured to store the designed light intensity distribution value.

7. The circuit device according to claim 1, wherein the plurality of light sources are LEDs, and the display panel is a liquid crystal display panel.

8. A display device comprising: the circuit device according to claim 1;
the backlight; and the display panel.

9. An electronic apparatus comprising: the circuit device according to claim 1.

10. A mobile body comprising: the circuit device according to claim 1.

11. A control method of a display device that includes a display panel and a backlight provided with a plurality of light sources for causing a processor to execute a process, the method comprising executing on the processor the steps of:
    receiving an input image corresponding to a plurality of pixels of a first zone of the display panel, the first zone being emitted by a light from a first light source of the plurality of light sources the firs light source being driven by a first light source initial driving value;
    obtaining a plurality of intensity values corresponding to the plurality of pixels of the first zone;
    receiving a designed light intensity distribution value of the first light source of the plurality of light sources;
    dividing the plurality of intensity values by the designed light intensity distribution value to obtain a corrected plurality of intensity values;
    obtaining a largest value of the corrected plurality of intensity values, the first light source initial driving value of the first light source being changed to a first light source corrected driving value corresponding to the largest value of the corrected plurality of intensity values;
    correcting a first part of the input image by driving the first light source with the first light source corrected driving value, the first part corresponding to an image displayed on the first zone of the display panel; and
    outputting an output image including the corrected first part to display the output image on the display panel and drive the plurality of light sources by a driving value including the first light source corrected driving value.

* * * * *